United States Patent [19]

Nishizawa

[11] Patent Number: 4,754,336
[45] Date of Patent: Jun. 28, 1988

[54] PICTURE DATA COMMUNICATION SYSTEM WITH SCANNING PATTERN CHANGE

[75] Inventor: Yoshitsugu Nishizawa, Kawasaki, Japan

[73] Assignee: Fujitsu Limited, Kawasaki, Japan

[21] Appl. No.: 942,286

[22] Filed: Dec. 16, 1986

[30] Foreign Application Priority Data

Dec. 20, 1985 [JP] Japan .................................. 60-287042

[51] Int. Cl.$^4$ ............................................. H04N 1/413
[52] U.S. Cl. .................................... 358/261; 358/280; 340/347 DD
[58] Field of Search ............... 358/260, 261, 263, 280, 358/133, 136; 340/347 DD

[56] References Cited

U.S. PATENT DOCUMENTS

| | | | |
|---|---|---|---|
| 4,542,413 | 9/1985 | Rallapalli et al. | 358/261 |
| 4,673,987 | 6/1987 | Toyokawa | 358/261 |
| 4,706,265 | 11/1987 | Furukawa | 358/261 |

Primary Examiner—Edward L. Coles, Sr.
Attorney, Agent, or Firm—Staas & Halsey

[57] ABSTRACT

A picture data communication system with a scanning pattern change includes a plurality of scanning pattern selecting units responsive to input picture signals for selecting a type of scanning pattern, a plurality of difference encoding and quantizing units responsive to the outputs of the scanning pattern selecting units for encoding and quantizing differences between data in adjacent frames in a sequence of frames for pixels and quantizing the encoded difference data. The system also includes a plurality of subsequent encoding units responsive to the outputs of the difference encoding and quantizing units for encoding the quantized encoded difference data and encoding and run length data representing the length of a sequence of the same pixel information, a comparison unit for comparing amounts of information between the outputs of the plurality of subsequent encoding units for determining the output of the minimum amount of information, a selection unit responsive to the outputs of the subsequent encoding units and the comparison unit for selecting the output of the minimum amount of information, and an identification unit responsive to the output of the selection unit for inserting a discrimination code to the selected output of the minimum amount of information.

1 Claim, 7 Drawing Sheets

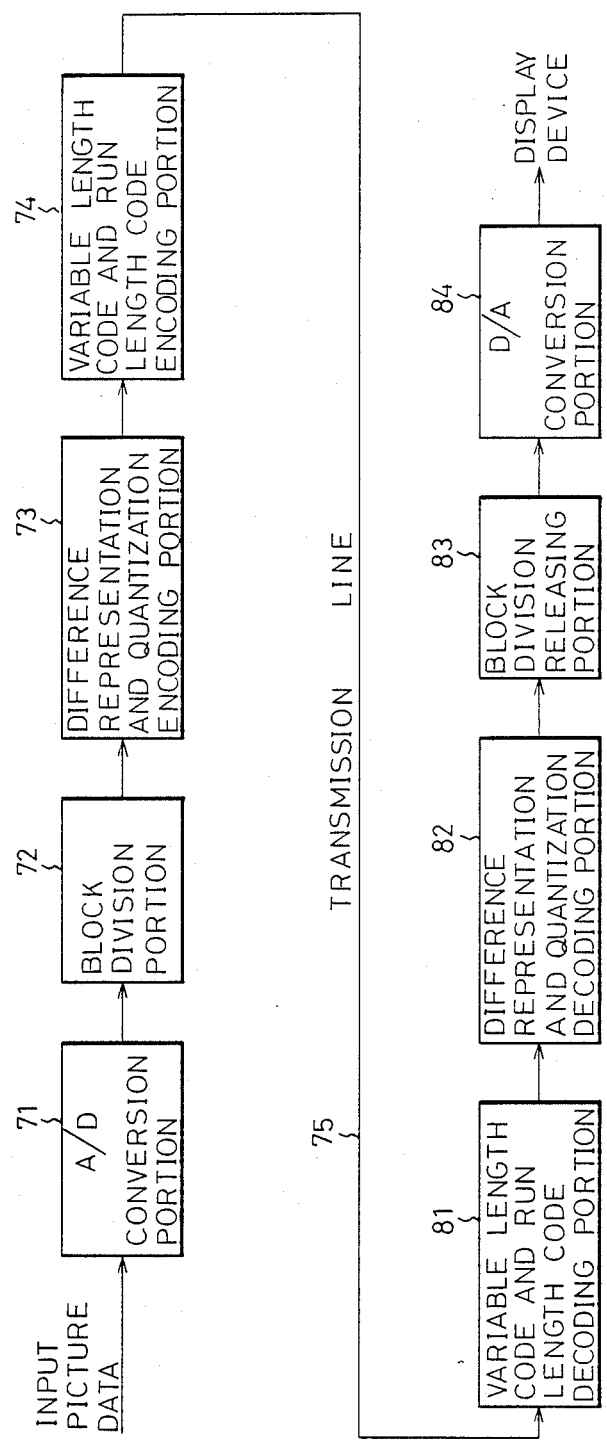

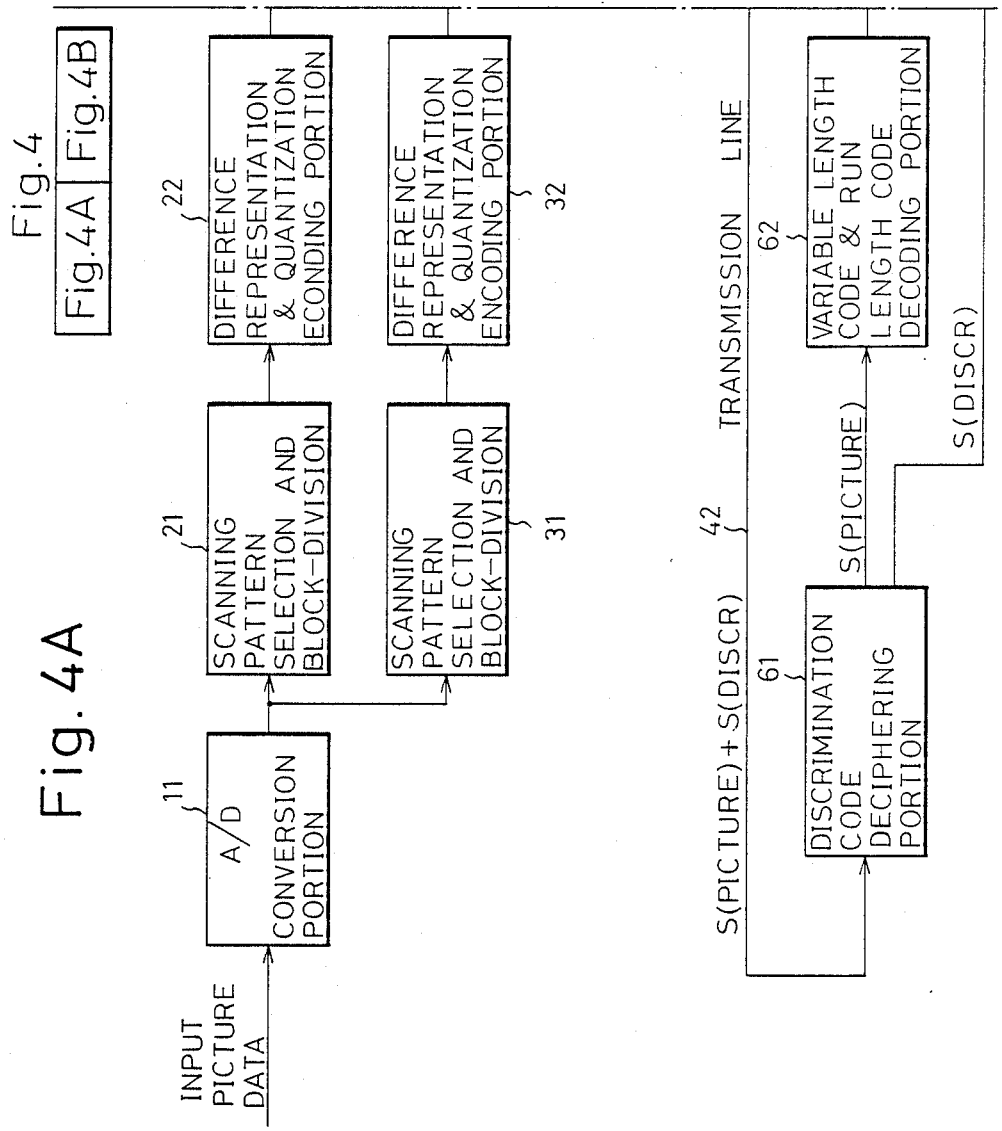

HORIZONTAL SCANNING PATTERN

VERTICAL SCANNING PATTERN

Fig. 6

DIFFERENCE REPRESENTATION
AND QUANTIZATION

| +3 | 0 | 0 | 0 |
|----|---|---|----|
| +1 | 0 | 0 | 0 |
| 0 | 0 | 0 | +1 |
| 0 | 0 | 0 | 0 |

Fig. 7

| QUANTIZATION LEVEL | OCCURRENCE FREQUENCY | VARIABLE LENGTH CODE WORD |
|---|---|---|
| NO. + 3 | 0.015625 | 1 1 1 1 1 0 |
| NO. + 2 | 0.0625 | 1 1 1 0 |
| NO. + 1 | 0.25 | 1 0 |
| NO. 0 | 0.5 | 0 |
| NO. − 1 | 0.125 | 1 1 0 |
| NO. − 2 | 0.03125 | 1 1 1 1 0 |
| NO. − 3 | 0.015625 | 1 1 1 1 1 1 |

PICTURE DATA COMMUNICATION SYSTEM WITH SCANNING PATTERN CHANGE

BACKGROUND OF THE INVENTION

1. Field of the Invention

The present invention relates to a picture data communication system. The system according to the present invention is used, for example, for picture data communication in a television conference system.

2. Description of the Related Arts

In general, in the transmitter side of a television conference picture data communication system, a pixel data sequence is block-divided and supplied to an encoding portion of a differential PCM type in which the encoding for difference representation and subsequent quantization is carried out. In a transmission of picture signals, a great amount of data is transmitted, and thus it is necessary to carry out a further encoding for a bandwidth reduction. Accordingly, the output of the encoding portion is supplied to a bandwidth reducing coding portion, such as a variable length code and run length code encoding portion, in which the assignment of variable length codes for difference representation and quantization and run length code is carried out.

The output of the encoding portion for difference representation and quantization is represented by quantization levels of, for example, 4 to 5 bits. The frequency or probability of occurrence is high, e.g., 90%, for relatively low quantization levels, such as $=2, =1, 0, -1,$ and $-2$.

In the variable length code encoding portion, a sequence of data is produced in which the codes for a high occurrence frequency are represented by relatively short bits and the codes for a low occurrence frequency are represented by relatively long bits. The encoding by the variable length code makes it possible to reduce the amount of generated data, compared with the encoding by the fixed length code.

Also, in the transmission of picture signals in which the sequence of "0" occurs frequently, it has been acknowledged that the run length coding technique is particularly effective for realizing a bandwidth reduction.

As described above, in the prior art, the manner of encoding pixel data is always fixed regardless of the nature of the input picture data. This fixing of the encoding manner has been found to be disadvantageous for attaining the most suitable picture scanning and data encoding, since the prior art encoding of pixel data deteriorates the efficiency of the transmission of data.

SUMMARY OF THE INVENTION

It is an object of the present invention to provide an improved picture data communication system in which the disadvantage in the prior art is eliminated and the transmission efficiency is accordingly enhanced.

In accordance with the present invention, there is provided a picture data communication system with a scanning pattern change in which a transmitter in the system includes: a plurality of block-dividing and scanning units responsive to input picture signals for block-dividing a frame and selecting a scanning pattern direction for each block of picture signals of a frame; an encoding unit operatively connected to the block-dividing and scanning unit for encoding the quantized encoded difference data and run length data representing the length of the sequence of the same pixel information; a comparison unit for comparing amounts of information between the outputs of the encoding units which correspond to a plurality of scanning patterns respectively, for determining the output of the minimum amount of the encoded pixel information; a selection unit for selecting the output of the minimum amount of information; and an identification unit responsive to the output of the selection unit for inserting a discrimination code which identifies the selected scanning pattern. The receiver in the system includes a unit for detecting the identification code, and a unit for arranging decoded data based on a scanning pattern indicated by the decoded code so that the transmitted picture is reproduced.

BRIEF DESCRIPTION OF THE DRAWINGS

In the drawings.

FIG. 3 shows a prior art system of picture data transmission;

FIG. 6 shows an example of the output of the encoding portion for difference representation and quantization in the system of FIG. 4; and, FIG. 7 shows an example of the variable length code words corresponding to quantization levels used in the system of FIG. 4.

DESCRIPTION OF THE PREFERRED EMBODIMENTS

Figure 1:
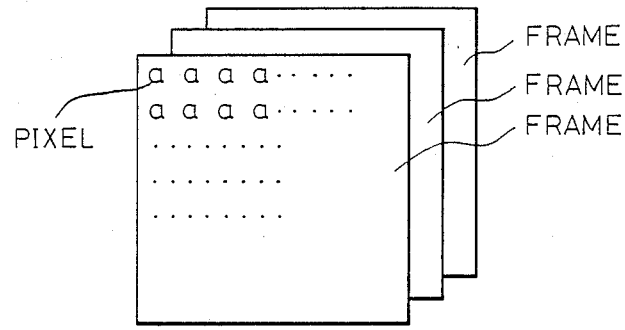
FIG. 1 shows a sequence of frames for pixels for television picture data in the prior art.
Figure 2:
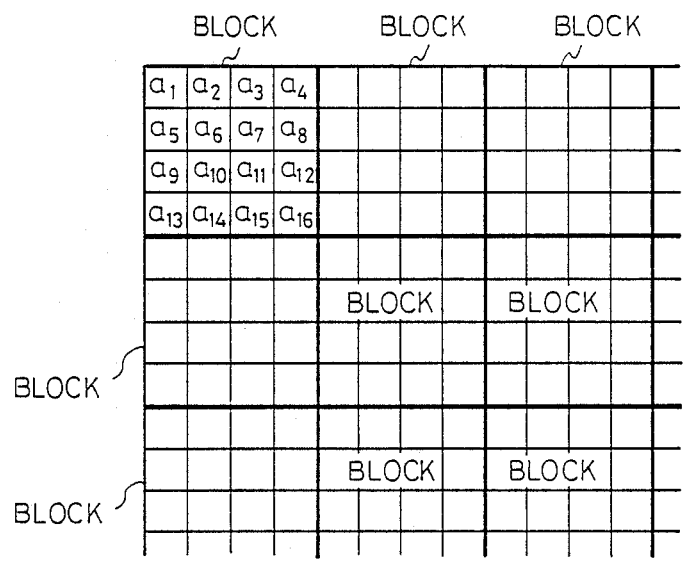
FIG. 2 shows block-division of a frame for pixels for television picture data in the prior art.

Before describing the preferred embodiments, an example of the prior art is explained with reference to FIGS. 1, 2, and 3. In general, television data is constituted by a sequence of frames for pixels as shown in FIG. 1. Each of the frames is divided into a plurality of blocks, as shown in FIG. 2, and each of the blocks is constituted by a plurality of pixels, for example, $a_1$ to $a_{16}$, distributed in a $4 \times 4$ pixel arrangement.

As shown in FIG. 3, in the transmitter, the input picture data signal expressed as a pixel data sequence is analog-to-digital converted in the analog-to-digital converter 71 into parallel signals of 8 bits and supplied to the block-division portion 72.

In the block-division portion 72, each frame of picture data is divided into a plurality of blocks. Each block consists of, for example, a sequence of pixels $a_1, a_2, a_3, \ldots a_{16}$. Writing into a memory or reading from the memory is carried out with this block as a unit. In this block, the sequence of pixels is arranged in 4 rows and 4 columns $a_1$ to $a_4$; $a_5$ to $a_8$; $a_9$ to $a_{12}$; and $a_{13}$ to $a_{16}$.

The signal from the block-division portion 72 is supplied to the encoding portion 73 for difference representation and quantization. In the encoding portion 73, the data representing the difference between the data of a pixel in a frame and the data of the corresponding pixel in the adjacent frame is obtained, and the obtained pixel difference data is quantized.

The difference-representing and quantized signal from the encoding portion 73 is supplied to the encoding portion 74 for producing a variable length code and run length code.

With regard to the signals of the picture of a television conference, the difference-representing and quantized data are usually represented by the quantization levels of 4 to 5 bits. It has been acknowledged that, in the quantization levels which can be represented by 8 bits, the low quantization levels such as +2, +1, 0, −1, and −2 occur with the highest frequency.

Accordingly, the assignment of a variable length code in the encoding portion 74 is carried out so that, per data of one pixel, short bits are assigned to the code having a high frequency of occurrence and long bits are assigned to the code having a low frequency of occurrence. The data produced by this assignment of bits is arranged as serial data, and the thus arranged serial data is delivered through the transmission line 75.

The serial data delivered through the transmission line 75 is received by the variable length code and run length code decoding portion 81 in the receiver side. In the variable length code and run length code decoding portion 81 in the receiver side, the decoding from the variable length code and run length code is carried out to reproduce the original signal, and this is supplied to the difference representation and quantization decoding portion 82.

In the difference representation and quantization decoding portion 82, the decoding from the signal of the difference representation and quantization is carried out, and the decoded signal is supplied to the block-division releasing portion 83. In the block-division releasing portion 83, the release from the block-division is carried out, and the released signal is supplied to the digital-to-analog converter 84.

In the digital-to-analog converter 84, the supplied digital signals are converted into analog picture signals which are supplied to a display device (not shown), which displays the received picture.

Figure 4B:
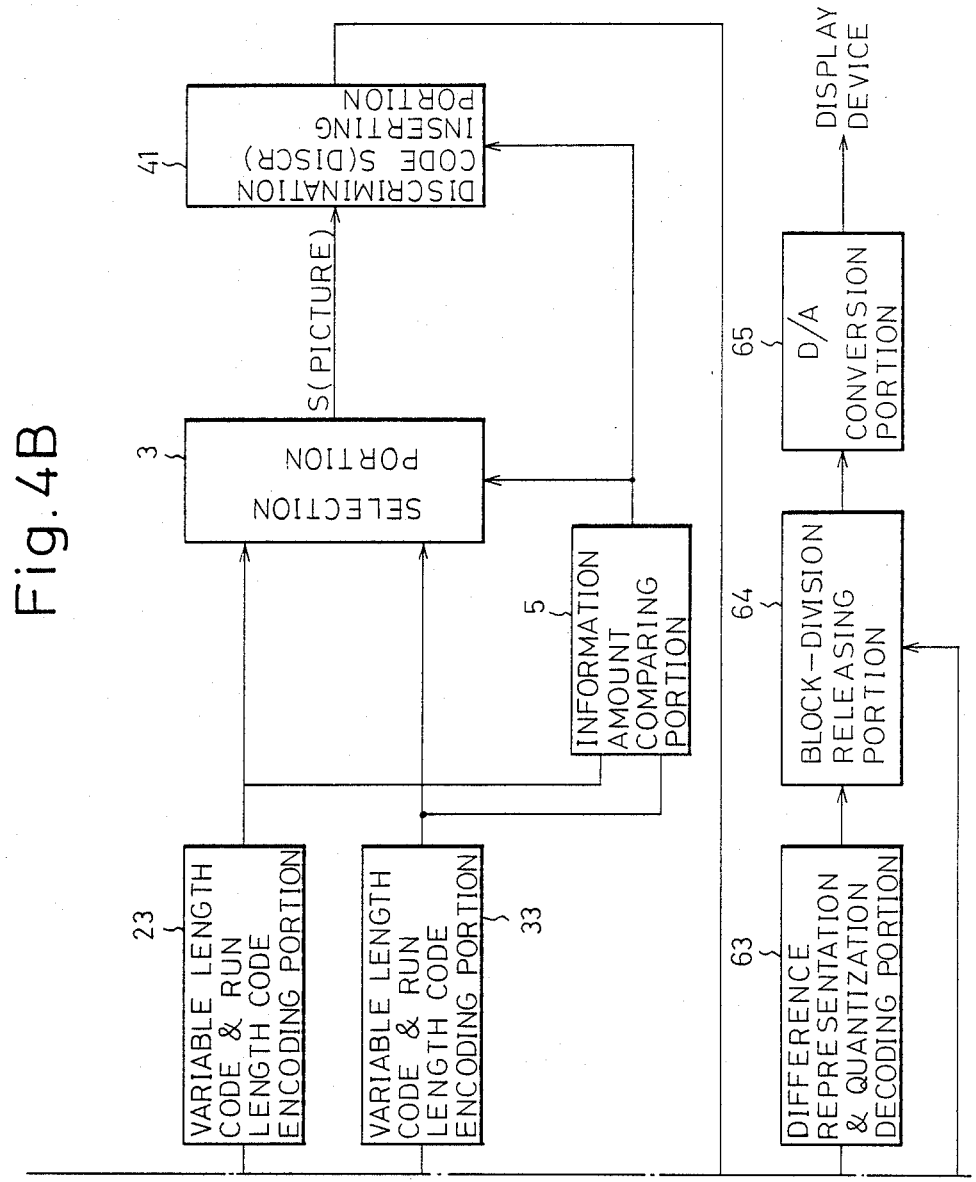
FIG. 4 shows a picture data transmission system with a scanning pattern change according to an embodiment of the present invention.

A picture data communication system with a scanning pattern change according to an embodiment of the present invention is shown in FIG. 4. In the transmitter side of the system shown in FIG. 4, there are provided an analog-to-digital conversion portion 11, a first scanning pattern sequence selection and block-division portion 21, a difference representation and quantization encoding portion 22, and a variable length code and run length code encoding portion 23, a second scanning pattern sequence selection and block-division portion 31, a difference representation and quantization encoding portion 32, a variable length code and run length code encoding portion 33, a selection portion 3, a discrimination code inserting portion 41, and an information amount comparing portion 5.

In the receiver side, there are provided a discrimination code deciphering portion 61, a variable length code and run length code decoding portion 62, a difference representation and quantization decoding portion 63, a block-division releasing portion 64, and a digital-to-analog portion 65.

Figure 5A:
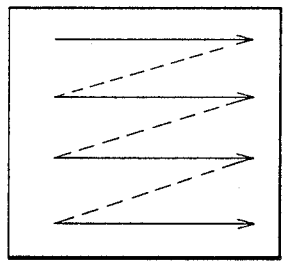
FIGS. 5A and 5B show horizontal and vertical scanning patterns that can be used in the system of FIG. 4.
Figure 5B:
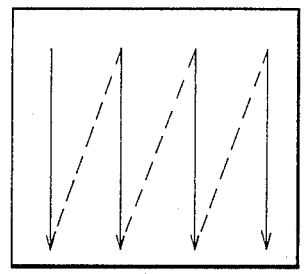

The scanning pattern selection and block-division portions 21 and 31 are arranged so that the scanning according to the horizontal scanning pattern shown in FIG. 5A is adopted in the scanning pattern selection and block-division portion 21, and the scanning according to the vertical scanning pattern shown in FIG. 5B is adopted in the scanning pattern selection and block-division portion 31. The block-division in the portions 21 and 31 is carried out to realize the block division shown in FIG. 2.

Each of the encoding portions 22 and 23 for difference representation and quantization receives a pixel data sequence following the block division shown in FIG. 2 and the scanning shown in FIGS. 5A or 5B, and carries out a difference representation operation by obtaining a data difference between a pixel in the present frame and a corresponding pixel in the next frame, and a quantization operation by quantizing the thus-obtained data difference. An example of the result of such difference representation and quantization is shown in FIG. 6.

Each of the variable length code and run length code encoding portions 23 and 33 receives a data sequence produced in one of the difference representation and quantization encoding portions 22 and 23, and carries out an assignment of a code word to the data from one of the encoding portions 22 and 32.

An assignment of a variable length code word to the difference representation and quantization data and an assignment of a variable length code word to the run length data are carried out. In this regard, the run length represents the length of a run (i.e., a sequence) of the same data. If a sequence of the same signals "0,0,0" of the binary signal occurs, the run length of this sequence will be 3.

An example of the assignment of a variable length code word is shown in FIG. 7. In FIG. 7, the correspondence between the level of quantization, the frequency or probability of occurrence, and the variable length code word is shown. It is known that the frequency of occurrence is high for low levels of quantization such as +2, +1, 0, −1, and −2. Variable length code words having a relatively short length are assigned to the quantization levels having a relatively high frequency of occurrence, and variable length code words having a relatively long length are assigned to the quantization levels having a relatively low frequency of occurrence.

Since code words having a relatively short length are assigned to the quantization levels having a relatively high frequency of occurrence, the amount of information generated as the result of the encoding in the system according to the present invention is smaller than that in the case where the length of code is fixed for the variation of the quantization levels.

Assignments of variable length code words for the run length code in the portions 23 and 33 are carried out for the data encoded by a variable length code. The variable length code word and the run length code word produced in the encoding portions 23 and 33 are supplied to the selection portion 3 and the information amount comparing portion 5.

In the information amount comparing portion 5, a comparison between the amount of data from the portions 23 and 33 is carried out to produce a selection signal which indicates the selection of the data having the shorter length and carrying less amount of data, after a comparison of the data from the portions 23 and 33. The produced selection signal is supplied to the selection portion 3 and the discrimination code inserting portion 41.

The amount of data produced from the sequence of the portions 21, 22, and 23 according to the horizontal direction scanning may be different from the amount of data produced from the sequence of the portions 21, 32, and 33 according to the vertical direction scanning. In the example of the difference representation and quantization shown in FIG. 6, the amount of data according to the horizontal direction scanning is greater than the amount of data according to the vertical direction scanning.

The change of the direction of scanning is carried out for each of the blocks.

The selection portion 3 selects the data having the shorter length, after a comparison of the data from the portions 23 and 33, and transmits that data to the discrimination code inserting portion 4 through a signal from the portion 5. In the discrimination code inserting portion 41, one of the discrimination signals indicating the kind of scanning pattern is produced and inserted in the data from the portion 3. The data constituted by the data from the portion 3 and the produced discrimination signal is delivered as transmission picture data to the transmission line 42.

The discrimination codes are, for example, "1" and "0" in the binary representation, corresponding to the two kinds of scanning patterns.

In the discrimination code deciphering portion 61 in the receiver side, the deciphering of the transmitted discrimination code is carried out, and the discrimination code and the transmitted picture data are separated. The picture data without the discrimination code is supplied to the variable length code and run length code decoding portion 62, where the variable length data representing the difference representation and quantization and run length data are reproduced. The reproduced data from the portion 62 is supplied to the difference representation and quantization decoding portion 63 where the difference representation data is reproduced. The reproduced data from the portion 63 is supplied to the block-division releasing portion 64.

In the block-division releasing portion 64, the release from the block-division and the reproduction of the original digital picture data are carried out. The direction of the block reproduction of the portion 64 is changed for each block unit based on the signal S(DISCR) from the portion 61. The data from the portion 64 is supplied to the D/A conversion portion 65, and the output from the portion 65 is supplied to the display device.

In the system according to the present invention, when the run length encoding is used, the amount of information generated is changed in correspondence with the scanning direction. In the system according to the present invention, the scanning direction is changed so as to minimize the amount of information generated, which makes it possible to further reduce the amount of picture data transmitted.

In the above-described embodiment, two kinds of scanning patterns, in horizontal and vertical directions, are used, but it is possible to use more than two kinds of scanning patterns. Namely, it is possible to use a scanning pattern other than in the horizontal or vertical direction, such as in a slant direction.

I claim:

1. A picture data communication system with a scanning pattern change in which picture data is transmitted by a transmitter with a digitization of a picture signal and an encoding of the digitized picture signal, the transmitter in the system comprising:

a plurality of block-dividing and scanning means for block-dividing a frame and selecting a scanning direction for each block of picture signals of a frame;

encoding means operatively connected to said block-dividing and scanning means for encoding run length data representing a length of a sequence of said pixel information;

comparison means for comparing amounts of information between outputs of said encoding means which correspond to a plurality of scanning pattern respectively, for determining an output of a minimum amount of information of encoded pixel information;

selection means for selecting said output of a minimum amount of information; and identification means responsive to an output of said selection means for inserting a discrimination code which identifies said selected scanning pattern.

* * * * *

UNITED STATES PATENT AND TRADEMARK OFFICE
CERTIFICATE OF CORRECTION

PATENT NO. : 4,754,336

DATED : June 28, 1988

INVENTOR(S) : Nishizawa

It is certified that error appears in the above-identified patent and that said Letters Patent is hereby corrected as shown below:

Col. 1, line 30, "=2, =1" should be ---+2, +1--.

Signed and Sealed this

Fifteenth Day of November, 1988

Attest:

DONALD J. QUIGG

Attesting Officer      Commissioner of Patents and Trademarks